July 28, 1942.   F. W. SLACK   2,291,111
VARIABLE SPEED TRANSMISSION MECHANISM
Filed Sept. 7, 1939   7 Sheets-Sheet 1
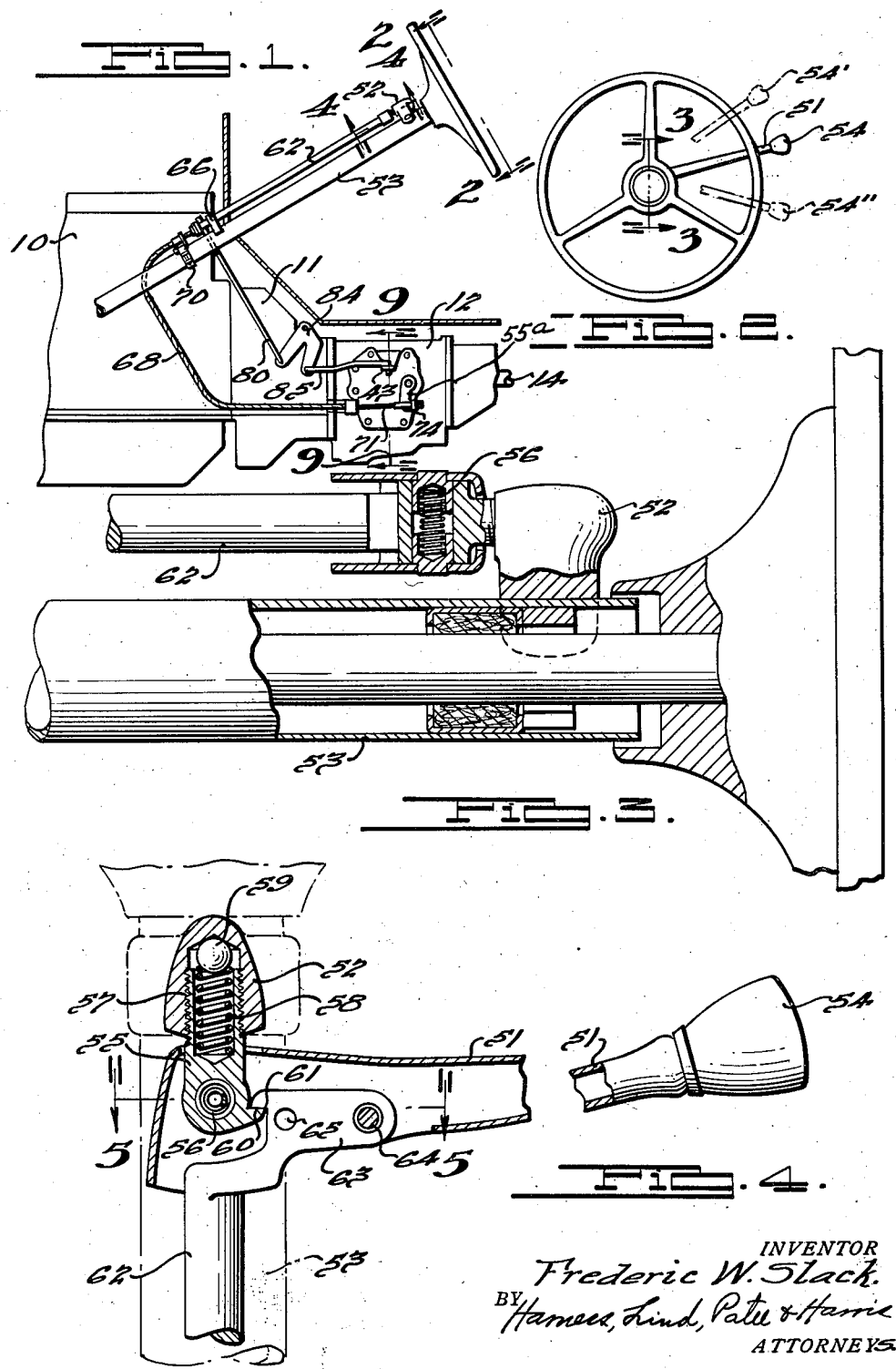
INVENTOR
Frederic W. Slack.
BY Hamer, Lind, Patu & Harris
ATTORNEYS

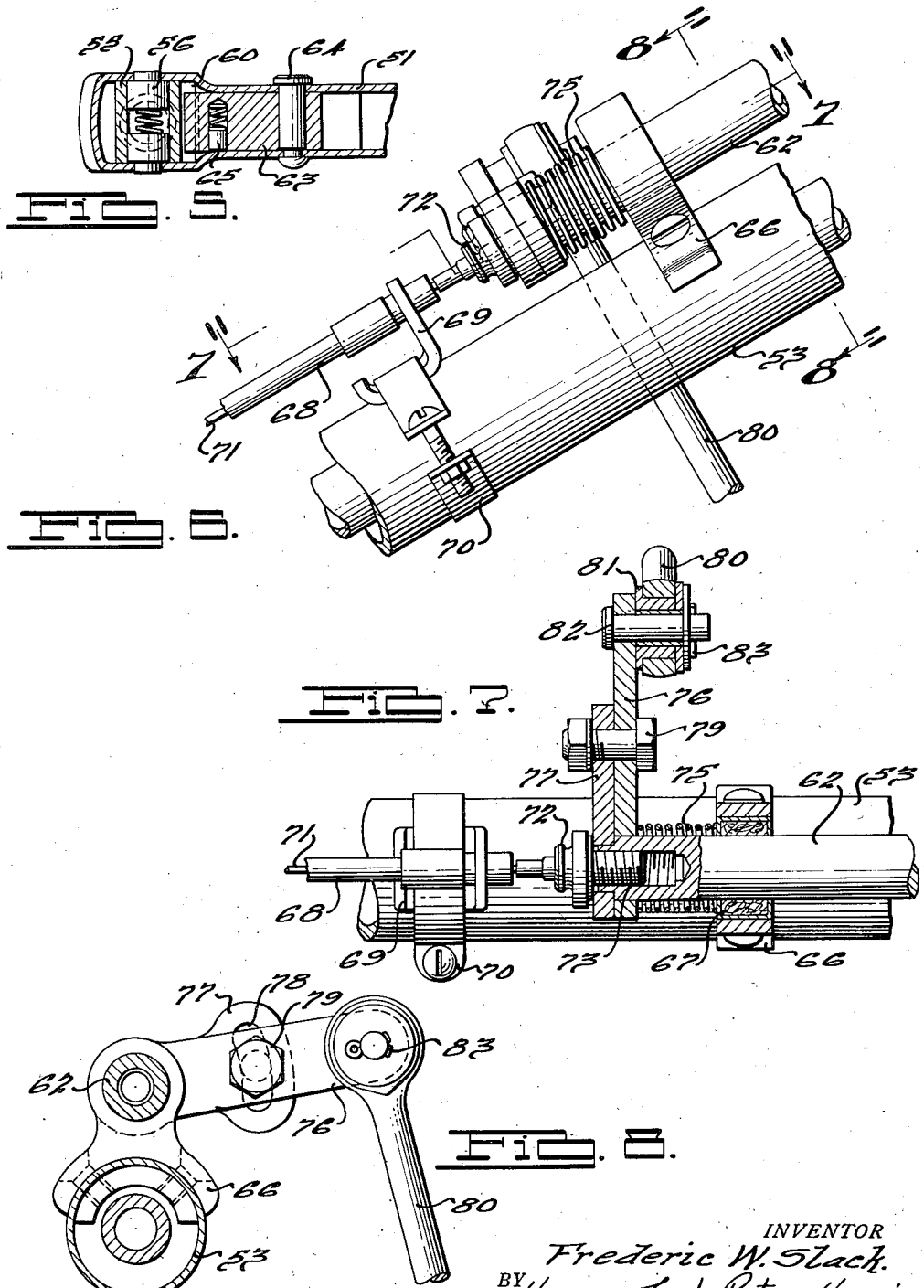

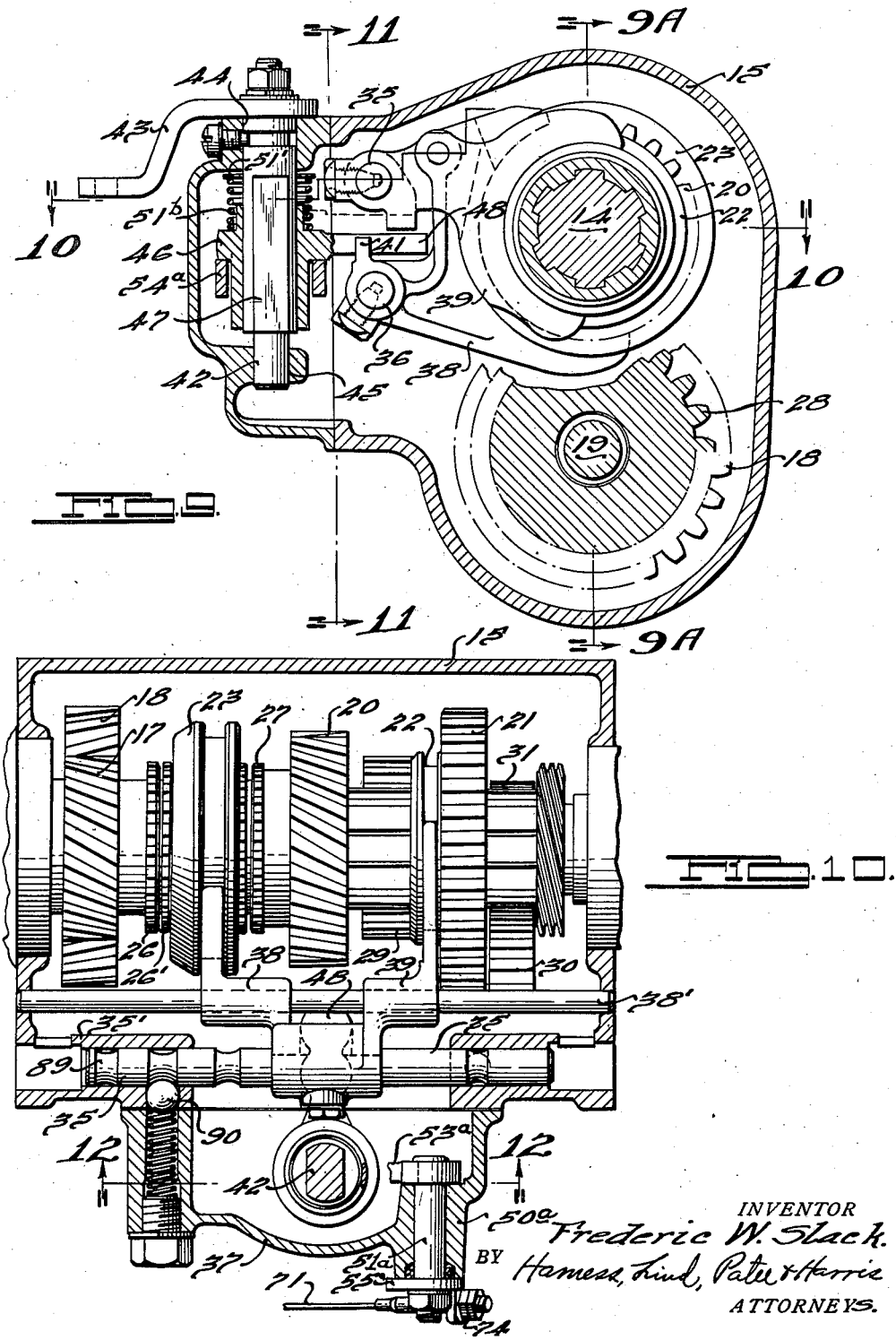

July 28, 1942.    F. W. SLACK    2,291,111
VARIABLE SPEED TRANSMISSION MECHANISM
Filed Sept. 7, 1939    7 Sheets-Sheet 4

INVENTOR
Frederic W. Slack.
BY Harness, Dickey, Pierce & Harris
ATTORNEYS.

July 28, 1942.   F. W. SLACK   2,291,111
VARIABLE SPEED TRANSMISSION MECHANISM
Filed Sept. 7, 1939   7 Sheets-Sheet 5
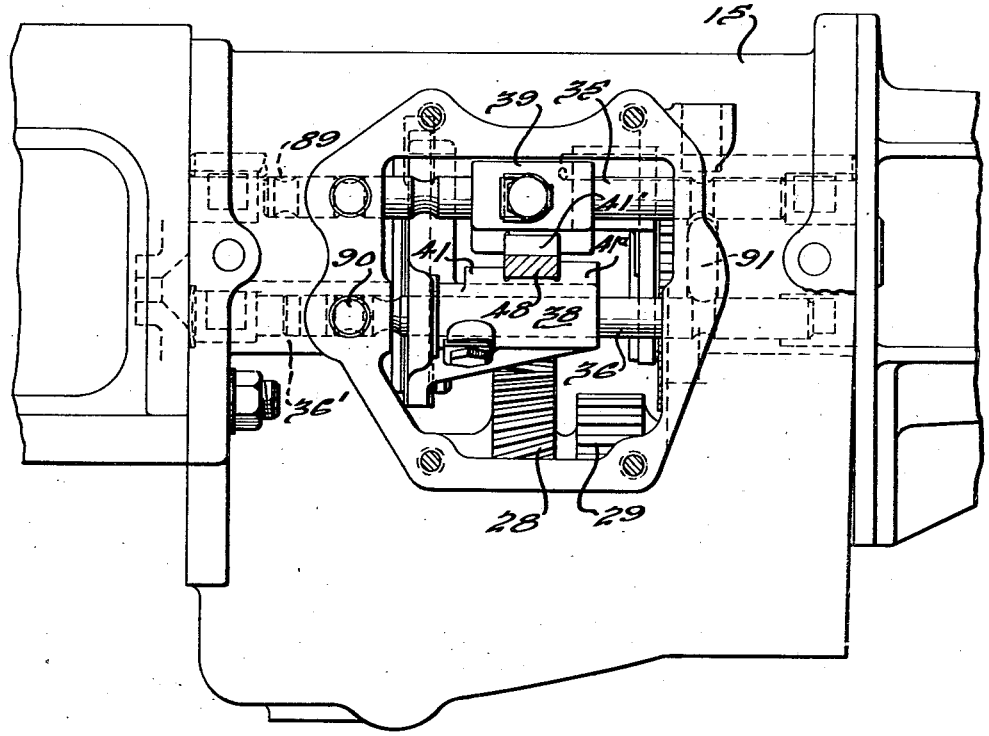
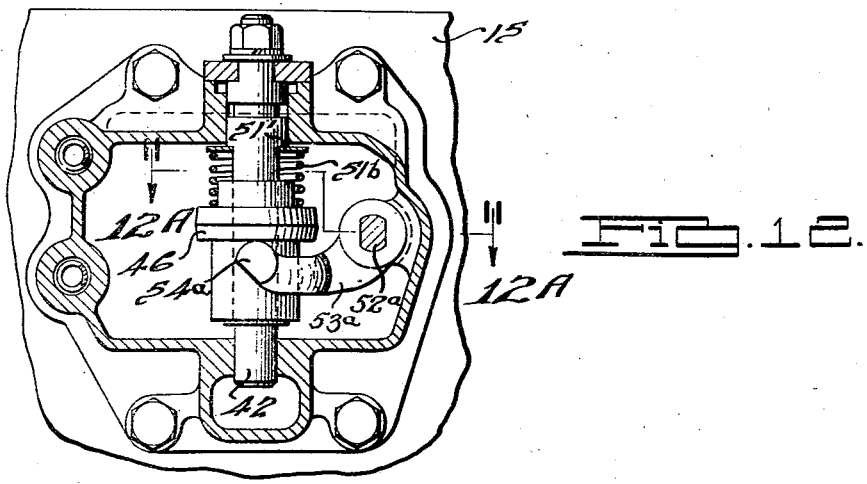
INVENTOR
Frederic W. Slack.
BY Hamess, Lind, Patu & Harris
ATTORNEYS.

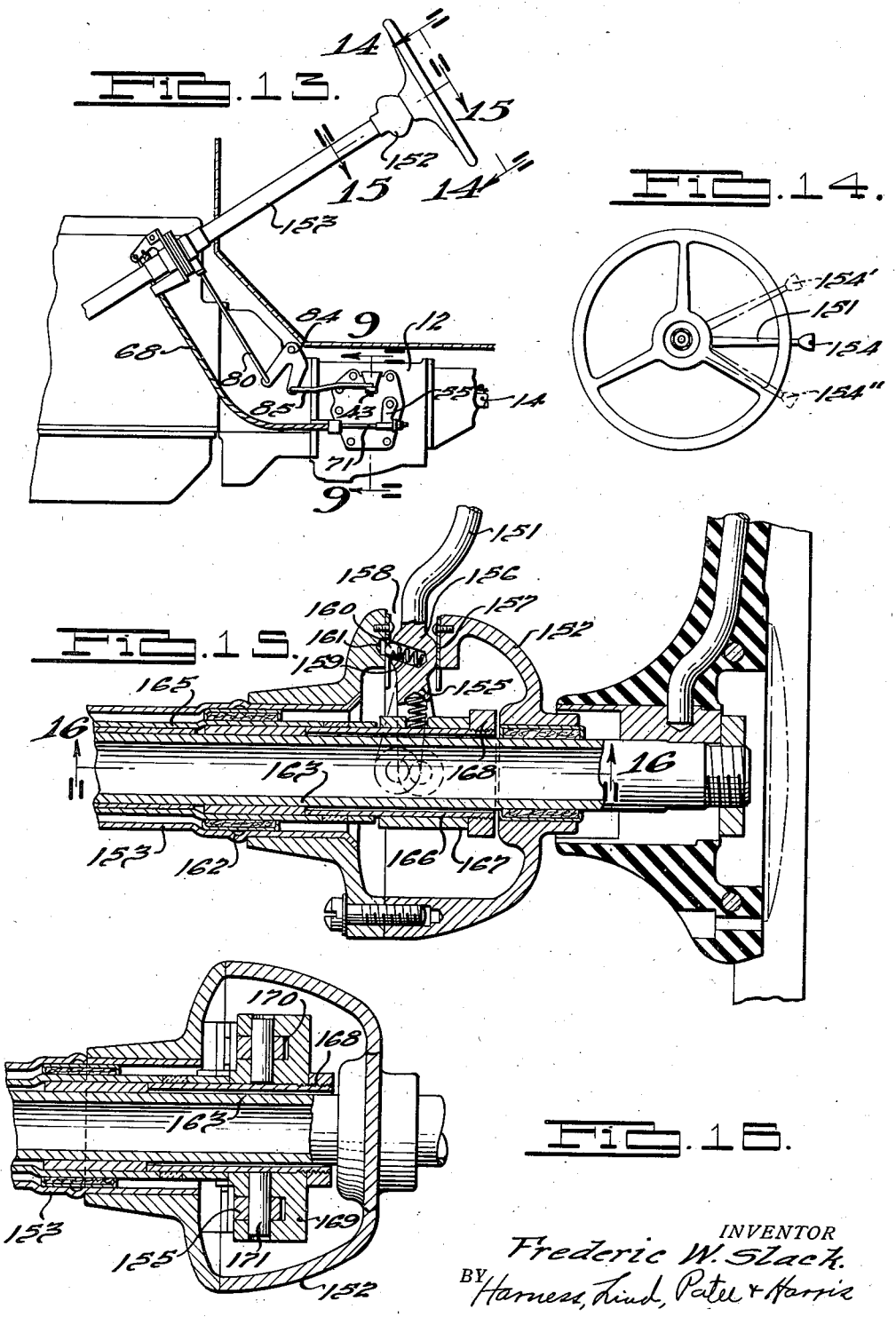

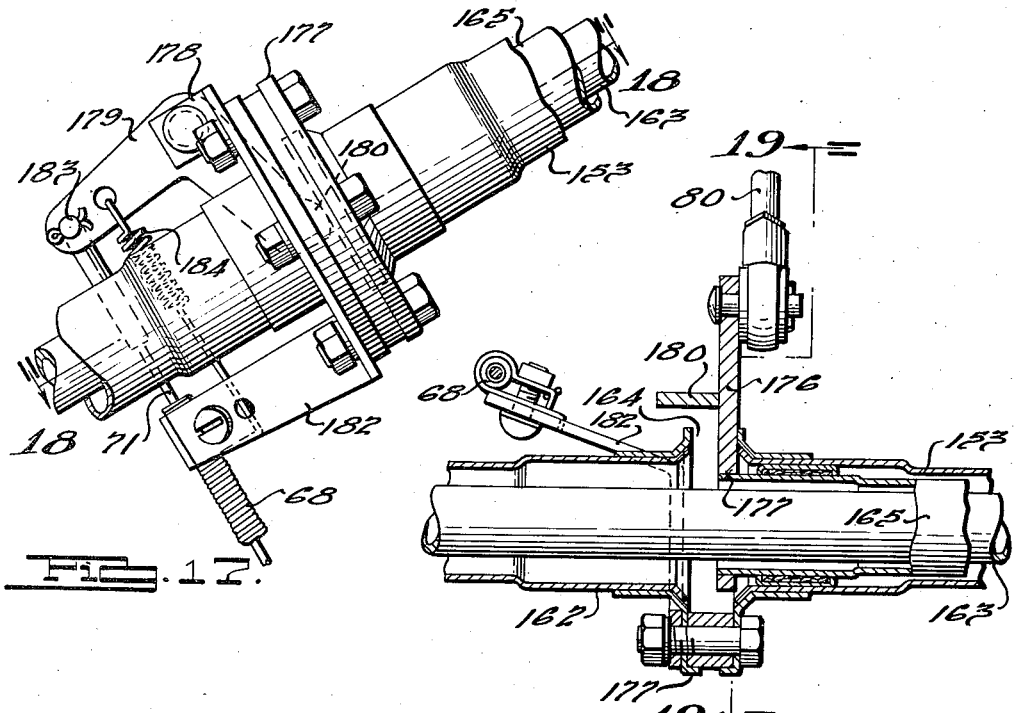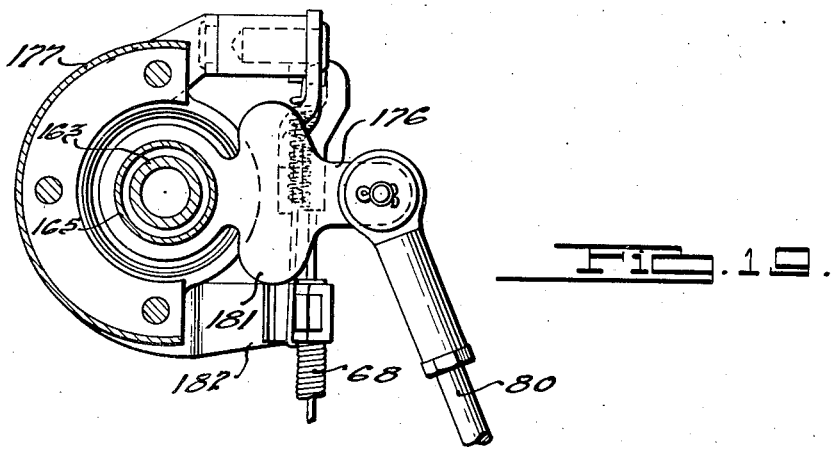

Patented July 28, 1942

2,291,111

UNITED STATES PATENT OFFICE 2,291,111

VARIABLE SPEED TRANSMISSION MECHANISM

Frederic W. Slack, Detroit, Mich., assignor to Chrysler Corporation, Highland Park, Mich., a corporation of Delaware Application September 7, 1939, Serial No. 293,657

2 Claims. (Cl. 74—484)

This invention relates to improvements in variable speed transmission mechanism.

More particularly, the invention pertains to improved gear shifting control apparatus for transmissions of this kind which is particularly adapted for use in motor vehicles.

One of the main objects of the invention is the provision of a transmission control apparatus of this character which is adapted to be mounted on the steering column structure of a vehicle.

Another object of the invention is the provision of transmission control apparatus of this type wherein the gear shift lever is yieldably retained in one of two selective paths of movement regardless of the position of the shiftable transmission elements.

A further object of the invention is the provision in transmission control apparatus of this character of a gear shift lever action by which selection of transmission speed ratio changing elements is accomplished by oscillation of the lever about an axis extending transversely of the steering column and speed ratio changes are effected by oscillation of the lever about an axis substantially parallel to the steering column.

Further objects of the invention are the provision of a shaft in a steering column of a vehicle which is shiftable longitudinally thereof and rotatable about its axis for transmitting respectively the selecting and speed ratio changing movements of the manual control lever; to provide in a transmission speed ratio changing system a single chain of mechanism extending from within reach of the driver to the transmission mechanism which is selectively engageable with a pair of different groups of speed ratio changing elements; to provide a flexible cable connection between the steering column mounted parts of the control apparatus and the transmission carried parts thereof for transmitting the speed ratio selecting action of the control lever so as to selectively operatively connect the control apparatus with either of said groups of speed ratio establishing members.

An additional object of the invention is the provision in a vehicle of a driver-operated selector element which is adapted for shifting movements in transversely connected paths in order to produce a plurality of speed ratio changing operations and which is oscillatable in a path connecting the aforesaid paths for selecting which one of the speed ratio establishing elements is to be operated by subsequent movement of the lever in one of the transversely connecting paths.

Additional objects and advantages of the invention will be apparent from the following description.

Two illustrative embodiments of the invention are shown in the accompanying drawings in which Fig. 1 is a diagrammatic, fragmentary, vertical, sectional view of a vehicle showing a transmission mechanism embodying the invention.

Fig. 2 is a plan view of the steering wheel, steering column and gear shift lever assembly along line 2—2 of Fig. 1.

Fig. 3 is a fragmentary, sectional view taken on the line 3—3 of Fig. 2.

Fig. 4 is a fragmentary, longitudinal, sectional view taken on the line 4—4 of Fig. 1.

Fig. 5 is a fragmentary, sectional view taken on the line 5—5 of Fig. 4.

Fig. 6 is a fragmentary view of the lower end of the steering post of Fig. 1.

Fig. 7 is a sectional view taken on the line 7—7 of Fig. 6.

Fig. 8 is a sectional view taken on the line 8—8 of Fig. 6.

Fig. 9 is a horizontal, sectional view taken on the line 9—9 of Figs. 1 and 13.

Fig. 10 is a fragmentary, sectional plan view taken on the line 10—10 of Fig. 9.

Fig. 11 is a transverse, vertical, sectional view taken on the line 11—11 of Fig. 9.

Fig. 12 is a horizontal, sectional view taken on the line 12—12 of Fig. 10.

Fig. 13 is a diagrammatic view, similar to Fig. 1, but of a modified form of the invention.

Fig. 14 is a plan view of the steering wheel, steering column and gear shift lever assembly along line 14—14 of Fig. 13.

Fig. 15 is a fragmentary, sectional view along line 15—15 of Fig. 13.

Fig. 16 is a fragmentary, sectional view along line 16—16 of Fig. 15.

Fig. 17 is an enlarged fragmentary view of the lower end of the steering column of Fig. 13.

Fig. 18 is a fragmentary view along line 18—18 of Fig. 17.

Fig. 19 is a fragmentary view along line 19—19 of Fig. 18.

Figure 9A:
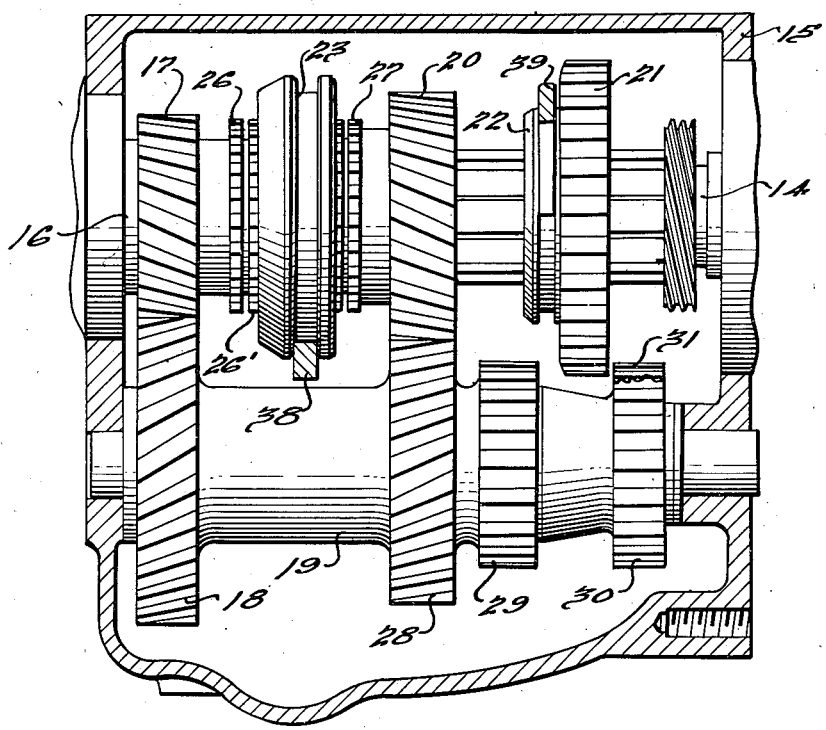
Fig. 9A is a horizontal sectional view taken on the line 9A—9A of Fig. 9.

In the drawings is illustrated an embodiment of the invention in a motor vehicle drive including a unitary power plant having an engine 10, clutch 11 and transmission mechanism, generally designated by the numeral 12, a drive shaft 14 extending rearwardly from the transmission to the rear wheels (not shown) of the vehicle.

The transmission 12 includes a housing 15 into which extends a driving shaft 16, having a gear 17 meshed with a gear 18 fixed on a countershaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gear 17 and 20 are hub portions which are provided with external clutch teeth 26 and 27 respectively. Splined on the shaft 14 is a hub member having teeth 26'. A shiftable clutch member 23 is splined on the hub member at a location between the hub portion of the gears 17 and 20 and provided with internal clutch teeth with which the clutch teeth 27 and 26 respectively are adapted to be selectively meshed as is well known in the art. A direct drive setting of the gears may be produced by shifting the clutch member 23 to the left, as viewed in Figs. 9A and 10, to connect the clutch teeth 26 with the teeth 26'. When the clutch member 23 is shifted to the right the teeth 27 and 26' are connected thereby holding the gear 20 against rotation relative to the shaft 14. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission at one side thereof are shiftably mounted in bosses 35' and 36' of the housing 15. A pair of laterally extending shifter forks 38 and 39 are slidably mounted on a rod 38' fixed in the housing at each end thereof, and respectively engage the grooves of the shift collars 23 and 22 as illustrated. The fork 38 is provided with a pair of spaced lugs 41 and 41a between which is receivable a rail shifting finger 48, which also has a part which is receivable into a notch 41' in the fork 39. As is clearly shown in Fig. 11, the lug 41a is of greater height than lug 41. This feature has an important bearing on the operation of the transmission and facilitates easy shifting thereof. It will be more fully described later on in this specification.

That portion of the control apparatus which is directly connected with the transmission mechanism housing is mounted on a cover 37 which is provided for closing the side opening of the transmission housing. The cover 37 includes a crowned central portion having opposite top and bottom wall portions extending longitudinally of the transmission in which are formed registering openings 44 and 45.

A shaft 42 extending vertically of the cover 37 is journalled at its ends in the openings 44, 45. The shaft 42 has an external end portion protruding from the cover member 37 on which a lever 43 is non-rotatably fixed. A collar 46 is disposed within the cover and axially slidably mounted on the intermediate portion of the shaft 42 which is provided with flats 47 for holding the collar and shaft against relative rotation. The collar 46 carries the rail shifting finger 48, heretofore referred to, which is provided with an intermediate lobe portion 49 that registers with and is adapted to be received between the lugs 41—41a of the rail 36, and a lobe portion 50 that registers with and is receivable by the notch 41' of the shifter fork 38. A coil spring 51b bears between a washer 51' which in turn bears against the upper rounded part of the shaft 42 and the enlarged portion of the collar 46 as shown in Figs. 9 and 12, for normally yieldably urging the collar 46 downwardly so as to retain the rail shifting finger 48 in operative engagement with the rail 36 and its shifter fork 38. The collar 46 may be moved upwardly, as viewed in Figs. 9 and 12, to bring the end lobe 50 into engagement with the notch 41' of the shifter fork 38 which is carried by the rail 35.

Figure 12A:
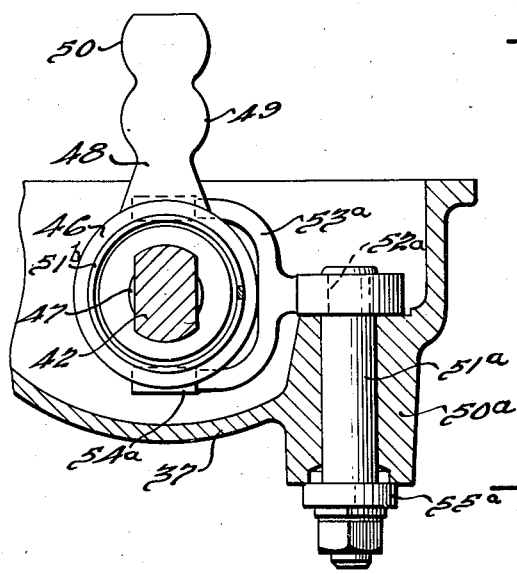
Fig. 12A is a sectional view taken along the line 12A—12A of Fig. 10.

The mechanism for moving the collar 46 upwardly against the pressure of the spring 51b is illustrated in Figs. 12 and 12A. The cover 37 has a transversely extending boss 50a in which is rotatably mounted a shaft 51a having a flattened inner end 52a on which is mounted a fork 53a. The latter has a pair of rounded end portions 54a which engage the underside of the enlarged portion of the collar 46 at each side thereof. A lever 55a (Figs. 1 and 13) non-rotatably carried on the outer end of the shaft 51a is adapted to be actuated by means about to be described which is under the control of the vehicle driver.

Apparatus for manually actuating the collar 46 may be mounted at any location in the driver's compartment of the vehicle within convenient reach of the driver. In the form of the invention illustrated in Figs. 1 to 8 inclusive, the manual control apparatus comprises a gear shift lever 51 which is carried on the steering column 53 by a bracket 52. The manual control lever is of stamped construction and has a knob 54 on its outer end. The inner end is shaped as shown in Figs. 4 and 5 and is pivotally mounted on the column 53 by means of a lug 55 which is threaded into the bracket 52 at 57. An easily removable spring pressed pin structure 56 secures the lever 51 to the lower end of the lug 55 and permits up-and-down movement of the lever in a direction parallel to the column. A coil spring 58 is carried in a bore provided for the same in the lug 55 and bears against the ball 59 which in turn bears against the inner top end of the lug receiving bore of the bracket 52. The spring 58 is relatively stiff and imposes a compression load on the threads 57 which prevents looseness between the lug 55 and bracket 52 yet permits the lever 51 to be easily swung about the axis of the lug 55 on the threads 57.

The lug 55 has a projecting ledge portion 60 at its lower end (Fig. 4) which is adapted to be engaged to a complementary ledge portion 61 formed on the upper integral portion 63 of a rod 62. The latter is pivoted at 64 to the lever 51 and carries a resiliently outwardly directed anti-rattle pin 65 in contact with the inner wall of the lever. Swinging of the lever 51 about its pivot 56 will cause the rod 62 to be moved in a direction parallel to the steering column 53.

At its lower end the rod 62 is supported on the column 53 for pivotal and bodily movement by means of a suitable yieldable bushing 67 carried in the column mounted bracket 66.

Axial movement of the rod 62 caused by rocking of the lever 51 about its fulcrum 56 is transmitted to the lever 55 by a Bowden wire assembly generally designated by the numeral 68. The upper end of the Bowden wire assembly is mounted on the steering column by means of the bracket 69 and clamp 70 as illustrated in Figs. 1, 6 and 7. A flexible cable 71 is provided with a fitting 72 which is threaded in the lower end of the rod 62 at 73 (Fig. 7). The cable 71 is attached at its lower end to the lever 55 by means of a fitting 74. A coil spring 75 is disposed between the bushing 67 and a lever 76 journalled on the lower end of the rod 62 and urges the rod 62 downwardly of the column 53 at all times. The rod 62 has a second plate-like lever 77 non-rotatably fixed at the external lower end thereof. The lever 77 is provided with a slot 78 adapted to receive a bolt 79 which also passes through a hole in the lever 76. The outer end of lever 76 has pivotally attached thereto one end of a rod 80, the other end being pivoted to a bellcrank lever 84 mounted for pivotal movement on the clutch housing 11. A suitable bushing 81 is provided between the levers 76 and 80, the parts being retained in assembled relation by a pin 82 and a cotter pin 83 as illustrated more clearly in Fig. 7.

The bellcrank lever 84 is operably connected to the shift lever 43 by means of a short rod 85 (Fig. 1). When the parts are assembled, the bolt 79 and the nut 74 are loosely assembled and after all of the parts have been fastened in place and connected, the manual shift lever 51 is held in its neutral position, the transmission parts being in neutral, and the bolt 79 and nut 74 are then tightened. This procedure permits variations in the positions of the parts and in the lengths of the levers, etc., due to manufacturing tolerances to be compensated for.

When the manually operated shift lever 51 is in its above described lower position, movement thereof in a counterclockwise direction about the axis of the rod 62 to the position designated 54' in Fig. 2 imposes a pull on rods 80 and 85 which causes forward movement of the lever 43. This in turn causes the shifter rail 36 to be moved toward the right of Figs. 9A, 10 and 11 so as to engage the clutch member 23 with the teeth 27 thereby establishing a second speed ratio setting of the transmission. When the lever 51 is moved in a clockwise direction to the position designated 54'', the rods 80 and 85 push the lever 43 rearwardly and the rail 36 is shifted toward the left of Figs. 9A, 10 and 11 to engage the clutch member 23 with the teeth 26 thereby establishing a direct drive setting of the transmission. Suitable detent mechanism 90 (Figs. 10 and 11) is adapted to engage grooves 89 provided in each of the shifter rails 35 and 36 for yieldably retaining the elements in the desired positions.

Upward movement of the manually operated lever 51 about its fulcrum 56 causes the rod 62 to be moved upwardly, compressing the spring 75, and pulling the cable 71 upwardly in its sheath. This in turn causes the lever 55 to be moved forwardly or clockwise about the axis of the shaft 51ᵃ and moves the collar 46 upwardly against the spring 51ᵇ thereby engaging the lobe 50 of the finger 48 with the notch 41' of the fork 39 and disengaging the lobe 49 from between the shoulders 41 and 41ᵃ of fork 38. Now, when the lever 51 is moved counterclockwise to the position 54', while being held in its uppermost position, the shifter rail 35 is moved toward the right of Figs. 10 and 11 to mesh the gear 21 with reverse idler 31 thereby establishing a reverse setting of the transmission. Clockwise movement of the lever to the position 54'' while being held in the uppermost position, moves rail 35 leftwardly and meshes gear 21 with gear 29 to establish low speed ratio setting. It should be noted that in shifting the rail 35 into low and reverse drive positions, it is not necessary for the driver to hold the collar 46 and finger 48 in their upper position against the spring 51 except during the initial shifting movement of the rail. As soon as the rail 35 has moved to the left or right of Fig. 11 far enough to misalign the notch 41' with the oppositely disposed notch between the lugs 41, 41ᵃ, the finger 48 will be retained in operative engagement with the notch 41' by the lugs 41, 41ᵃ throughout its range of shifting movement on either side of neutral position. In other words, the lever 51' need only be held upwardly against the force of spring 51 (when shifting into low or reverse) long enough to engage finger 48 in notch 41' and move rail 35 out of neutral, the swinging movement of lever 51' for shifting the rail 35 may then be continued with the lever 51' in its lower path of movement, this action being readily accommodated in the linkage because the fork 53 is not positively connected to the collar 46.

A suitable interlock 91 (Fig. 11) is provided to lock one of the shifter rails against accidental movement while the other is being shifted.

In describing the operation of the device, let it be assumed that the motor vehicle is at rest with the motor running and the manually shiftable lever 51 positioned in the neutral position as indicated by the numeral 54 in Fig. 2. In starting the vehicle, the operator depresses the clutch pedal in the usual manner and grasps the knob 54 of the lever 51 and rocks the lever about the fulcrum 56 longitudinally upwardly of the steering column. This action lifts rod 62 and pulls cable 71 upwardly thereby rotating the selector lever 55 forwardly about the axis of shaft 51ᵃ, this action compressing both the spring 75 and the spring 51ᵇ. Lever 51 is then pulled backwardly toward the driver which action rotates rod 62 and lever 76 clockwise of the steering column thereby swinging rod 80 rearwardly of the transmission and imparting a rearward push to rod 85 thus swinging lever 43 rearwardly about the axis of shaft 42 and shifting rail 35 with which the finger 48 is now operatively connected and meshing gear 21 with gear 29 to establish low speed drive through the transmission. Engagement of the vehicle clutch (not shown) will now cause the vehicle to be driven forwardly in low gear. The knob 54 is now in first speed position as indicated by the numeral 54'' in Fig. 2 and release of this knob by the driver will allow it and lever 51 to fall longitudinally downwardly relative to the steering column 53 to the high speed position, such action being assisted by the spring 75 which was previously compressed upon upward movement of the knob 54. The flexible cable 71 returns the fork 53ᵃ to the position shown in Fig. 12 because of the fact that the fork 53ᵃ bears on the bottom side of the enlarged portion of the collar 46 but is unconnected thereto. The collar 46 remains in its upper position with the spring 51ᵇ compressed due to the engagement of the finger 48 with the upper surface of lug 41.

It will thus been seen that the shift from low speed to second or intermediate speed may be made by a single forward movement of the knob 54 from the position indicated at 54'' to the position indicated at 54', such movement taking place in the lower path of the movement of the knob 54. As soon as the knob 54 has moved from the position 54'' to neutral position, gear 21 will have been moved out of meshing engagement with gear 29 and shifter rail 35 will be in neutral position. The finger 48 will then be released from the notch 41' and the collar 46 will be returned to the position shown in Fig. 12 under the influence of the spring 51b. Movement of the knob 54 forwardly to the position 54' will rock the rod 62 in counterclockwise direction and will mesh the internal teeth of the clutch member 23 with the teeth 27 to establish second or intermediate speed drive through the transmission. It will be understood that this shifting movement can be accomplished very quickly and positively because of the fact that the lever 51 is moved counterclockwise away from the driver only without the necessity of "feeling" through the crossover which connects the two paths of movement of the lever 51 as is usual in conventional shifting mechanisms. Thus it may be seen that the shift from first to second speed may be accomplished with smoothness and rapidity by the arrangement of parts herein disclosed. Because of the fact that the lever 51, rod 62, cable 71, arm 55 and fork 53a are returned to the position shown in Figs. 1, 4, 6 and 12 immediately after the transmission has been shifted into low speed, the spring 51b is required to move the collar 46 only during the shift from first to second speed. Because the spring 51b is relieved of the frictional load of the mechanism connecting the fork 53a with the lever 51, a very rapid and desirable "snap-over" action of the collar 46 results. This "snap-over," or as it is sometimes called, "automatic crossover" action of the selector finger 48 is facilitated by the difference in height between the lugs 41 and 41a. As is apparent from Fig. 11, as the rail 35 is shifted from left to right with the shift lever 51 and fork 53 in their Figs. 1 and 12 positions, the finger 48 will engage the side of lug 41a when the finger reaches neutral position. The spring 51a will then snap the collar 46 and finger 48 downwardly disengaging the latter from fork 39 and engaging it with fork 38. Thus it may be seen that the shift from first to second speed may be accomplished with knob 54 in its lower path of movement, unintentional shifting into reverse being prevented by the lug 41a which engages finger 48 when the latter reaches neutral as aforesaid.

The difference in height between the lugs 41—41a also serves as an automatic interlock and prevents the rail 35 from continuing its travel toward the right of Fig. 11 after the finger 48 has moved out of engagement with notch 41'. In making a fast shift from first to second speed, considerable momentum is imparted to rail 35 which might carry the same past neutral before rail 36 has had time to move the interlock pin 91 upwardly to lock the rail 35, thus causing damage to the transmission parts. With the aforesaid arrangement, however, the finger 48 engages the lug 41a while it is still engaged in the notch 41', therefore the rail 35 must come to a dead stop to permit finger 48 to disengage completely from said notch. In other words, there is an instant when finger 48 is engaged with both members 38 and 39, both rails being stationary at this instant because of the pin 91 which holds rail 36 from movement.

The shift from second speed to high speed setting of the transmission is accomplished by moving the knob 54 clockwise to the position 54''. This results in the clockwise movement of the rod 62 through which the intermediary of the levers 76, 80, 84, 85 and 43 meshes the clutch teeth of the member 23 with the teeth 26.

Figs. 13 to 19 inclusive illustrate a modified form of the remote shift control mechanism which differs from that previously described in several essential details. In the form of the invention illustrated in Figs. 13 to 19 inclusive the parts of the remote shift mechanism which extend into the driver's compartment of the vehicle are concealed within the steering column with the exception of the manually shiftable lever which is designated 151 in this modification.

The lever 151 is carried by a casing 152 having operable sections mounted in the steering column which is generally designated by the numeral 153. The manual control lever 151 has a knob 154 on its outer end and it has a forked inner extremity 155 disposed within the casing 152. Provided on the lever 151 adjacent its forked end is a ball-shaped enlargement 156 which is disposed between gear plates 157 mounted on the opposite side walls of an arcuate slot 158 formed in the casing 152 through which the lever 151 extends. The enlarged portion 156 of the control lever has a bore 159 in which a spring pressed detent 160 is disposed. The detent 160 is adapted to engage in an aperture 161 formed in the lower wall of the slot 158 when the lever 151 is centrally located with respect to the opposite end of this slot. The steering column generally designated by the numeral 153 includes an outer tube 162 on which the casing 152 is mounted and an inner tubular steering shaft 163 which is provided with a steering wheel as is conventional in the art. The steering shaft 163 extends longitudinally of the steering column and is centrally located with respect to the longitudinal axis thereof.

A tubular shaft 165 extends longitudinally of the steering column 153 and is axially slidably and rotatably supported by the steering column structure. Mounted in the upper open end of the tubular shaft 165 is a sleeve 166 which is welded or otherwise suitably secured thereto and which extends beyond the upper extremity of this shaft. A collar 167 is concentrically mounted on the portion of sleeve 166 which extends beyond the shaft 165 and is detachably and non-rotatably held thereon by a nut 168 threaded on the upper end portion of the sleeve 166 as viewed in Figs. 13 and 16. The collar 167 is provided with diametrically opposed bosses 169 shown in Fig. 16 in which are formed slots 170 for receiving the apertured end portions of the prongs of the fork 155. The fork 155 of the lever 151 is pivotally attached to the bosses 169 of this collar by pins 171 extending through registering apertures in the bosses and prongs of the fork respectively. The enlarged portion 156 of the lever 151 serves as a fulcrum about which this lever may be oscillated in a vertical plane as viewed in Fig. 14 to shift the shaft 165 axially of the steering column. The shaft 165 may be rotated about its axis which is coincident with the longitudinal axis of the steering column by shifting the lever 151 upwardly or downwardly from its full line position shown in Fig. 14 and during this action of the lever the enlarged portion 156 thereof slides freely on the bearing surfaces provided by the wear plates 157 with which the walls of the slot 158 are aligned.

At the bottom of the steering column the tube 162 thereof is provided with a slot 164 through which a lever 176 extends. This lever is welded to the lower end of the tube 165 as indicated at 177 in Fig. 18 and is connected to a rod 80 which is identical with the rod 80 of the modification shown in Fig. 1.

Partly surrounding the slot 164 is a housing structure 177 which is most clearly illustrated in Figs. 17, 18 and 19. This housing structure 177 has a tab 178 on which is pivoted a bellcrank lever 179 which has a rounded portion 180 which bears against the enlarged portion 181 of the lever 176. On the opposite side of the steering column, the housing structure 177 has a depending bracket 182 which supports the upper end of the Bowden cable structure 68 which is identical with that illustrated in the modifications of Fig. 1. The flexible, motion transmitting cable 71 of the Bowden cable structure is connected with the lower end of the bellcrank lever 179 as indicated at 183 and a spring 184 connected to the bracket 182 and the bellcrank lever 179 urges the shaft 165 upwardly of the column 153. The spring 184 performs a similar function to the spring 75 of Fig. 6 in that it continuously urges the manually shiftable lever 151 into the lower of the two paths of gear shifting movement.

It may thus be seen that while the direction of movement of the shaft 163 in the modification just described is opposite to the direction of movement of the rod 62 in the Fig. 1 modification of the invention, similar movements are transmitted to the transmission mechanism 12 with similar movements of the manually shiftable lever 151. The device operates in a manner identical to that previously described for the Fig. 1 modification, all of the desirable featuers mentioned therein being present in this modification of the invention including the straight forward shift of the lever 151 from low speed setting of the transmission to intermediate speed setting thereof accompanied by the desirable "snap-over" action of the collar 46.

Having thus described two preferred embodiments of my invention, that which I regard as new and desire to secure by Letters Patent is set forth in the following claims.

I claim:

1. In combination with a vehicle steering column, a gear shift lever, and means for mounting said lever on said column for oscillation about an axis disposed longitudinally relative to said column and for rocking movement about an axis extending transversely to said longitudinal axis comprising, a bracket carried by said column and having an integral internally threaded boss, a threaded pin adapted to be received by said boss, yieldable means operatively associated with said pin and boss for imposing a frictional load on the respective threads thereof, and means for pivoting said shift lever to said pin on an axis disposed transversely to the axis of said pin.

2. In combination with a vehicle steering column, a gear shift lever, and means for mounting said lever on said column for oscillation about an axis disposed longitudinally relative to said column and for rocking movement about an axis extending transversely to said longitudinal axis comprising a bracket carried by said column and having an integral internally threaded boss, a threaded pin adapted to be received by said boss, said pin having a bore therein, a coil spring in said bore operatively disposed such that it acts between said pin and said boss thereby to impose a frictional load on the threads and means for pivoting said shift lever to said pin on an axis disposed transversely to the axis of said pin.

FREDERIC W. SLACK.